(12) United States Patent
Umemura (10) Patent No.: US 7,208,750 B2
(45) Date of Patent: Apr. 24, 2007

(54) RADIATION IMAGE READING APPARATUS

(75) Inventor: Masahiro Umemura, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 180 days.

(21) Appl. No.: 11/047,561

(22) Filed: Feb. 2, 2005

(65) Prior Publication Data

US 2005/0173660 A1   Aug. 11, 2005

(30) Foreign Application Priority Data

Feb. 5, 2004   (JP)   ............................. 2004-029243

(51) Int. Cl.
  *B65H 5/02*   (2006.01)
(52) U.S. Cl. ...................... 250/589; 250/580; 250/581; 250/582; 250/583; 250/584; 250/585; 250/586; 250/587; 250/588; 250/590
(58) Field of Classification Search ................ 250/589, 250/580, 581, 582, 583, 584, 585, 586, 587, 250/588, 590
See application file for complete search history.

(56) References Cited

U.S. PATENT DOCUMENTS

| | | | |
|---|---|---|---|
| 2001/0019402 A1* | 9/2001 | Tanabe | ........................ 355/64 |
| 2002/0159104 A1 | 10/2002 | Tsukinowa | |
| 2005/0116188 A1* | 6/2005 | Yagi | ............................ 250/591 |
| 2005/0167623 A1* | 8/2005 | Yonekawa | ................... 250/589 |
| 2006/0081796 A1* | 4/2006 | Umemura | .................... 250/589 |

FOREIGN PATENT DOCUMENTS

JP   2002 278000   9/2002

OTHER PUBLICATIONS

European Search Report.

* cited by examiner

*Primary Examiner*—David Porta
*Assistant Examiner*—Christine Sung
(74) *Attorney, Agent, or Firm*—Finnegan, Henderson, Farabow, Garrett & Dunner, L.L.P.

(57) ABSTRACT

A radiation image reading apparatus includes an image reading section for reading a radiation image on a stimulable phosphor sheet by scanning the stimulable phosphor sheet with exciting light in a main scanning direction, and a conveying section having a windable member to hold the stimulable phosphor sheet, a supporting member to support the windable member, and a driving section to move the windable member so as to convey the stimulable phosphor sheet to the image reading section in a sub scanning direction. The apparatus further includes a vibration damping mechanism being in contact with the windable member to damp vibration of the windable member, and a vibration refraining mechanism being in contact with the vibration damping mechanism to refrain vibration of the vibration damping mechanism itself.

9 Claims, 6 Drawing Sheets

RADIATION IMAGE READING APPARATUS

FIELD OF THE INVENTION

The present invention relates to a radiation image reading apparatus for reading radiation image information accumulated in a stimulable phosphor sheet.

BACKGROUND OF THE INVENTION

In recent years, in order to obtain radiation images for medical diagnosis, taking the place of conventional systems which use a silver halide film, systems as follows have been brought into practical use. Namely, they are systems which make a phosphor absorb radiation having passed through a photographic object, thereafter excite the phosphor, for example, with light or heat energy, thereby having the radiation energy accumulated in the phosphor radiate as fluorescence, and then detect the fluorescence to generate an image. Specifically, for example, as disclosed in Patent Document 1 and Patent Document 2, there are systems which employ a stimulable phosphor sheet formed with a stimulable phosphor layer on a support body, emit radiation having passed through a photographic object onto the stimulable phosphor layer of the sheet so that radiation energy corresponding to the radiation transmission amount of each portion of the photographic object is accumulated, thereby forming a latent image. Then, the systems scan the stimulable phosphor layer with stimulable exciting light to radiate accumulated radiation energy of each portion and convert it into light, and convert the light intensity into image signals via an optoelectronic converter such as a photomultiplier so as to obtain a radiation image as digital image data.

Visualization of images is carried out by forming an image on a silver halide film, based on the obtained digital image data, or outputting the image data on an image display such as a CRT. Digital image data is sometimes stored in an image storage device such as a semiconductor storage device, a magnetic storage device, an optical disk storage device, or the like, and is later read from the image storage device to be visualized, as necessary.

During scanning a stimulable phosphor sheet with exciting light, the stimulable phosphor sheet and an exciting light source should have precise relative motion at a constant velocity. Patent Documents 3 and 4 disclose radiation image reading apparatuses which perform sub scanning of a stimulable phosphor sheet by moving up and down a member holding the sheet with a belt wound around a driving pulley in the following manner. With high accuracy of positioning and of constant velocity control by the use of a weight balance arranged at the other end of the belt, these apparatuses press a roller (vibration damper) against the belt approximately orthogonally to the conveying direction of the belt to inhibit vibration so that image nonuniformity due to conveying nonuniformity in the sub scanning direction is inhibited.

According to Patent Document 4, a unit for inhibiting the vibration of the vibration damper itself is provided so that image nonuniformity due to conveying nonuniformity in the sub scanning direction is further securely inhibited.

[Patent Document 1] U.S. Pat. No. 3,859,527
[Patent Document 2] TOKKAI-SHO No. 55-12144
[Patent Document 3] TOKKAI No. 2002-278000
[Patent Document 4] TOKKAI No. 2003-98609

However, the above known arts still have problems as follows.

At a start of driving a steel belt from a stopped state, a shock load is applied to the steel belt and vibration damper, requiring a time for stabilization. Therefore, a preliminary conveying space to be used before image reading should be prepared in order to achieve stable sub scanning in image reading. In this case, the motion space as the total of the sub scanning space for image reading and the preliminary conveying space is large, which causes low space efficiency. On the other hand, in a case of starting image reading simultaneously with a start of conveyance-driving without setting a preliminary conveying space, or in a case where enough preliminary conveying space is not allowed, there is a problem that image nonuniformity is caused at a start of image reading.

The time required for stabilization of conveying motion varies with the weight of a conveyed object, the mechanical state of a conveying device, the state of the installation site, and other conditions. If an apparatus is to have a preliminary conveying space that is large enough under any conditions, an even larger motion space is required, causing a problem of even lower space efficiency.

SUMMARY OF THE INVENTION

The present invention considers the above problems with the above known arts. Accordingly, an object of the invention is to control vibration caused by a shock at a start of a conveying member from a stopped state, corresponding to the cause of the vibration, and thus prevent generation of nonuniformity of a read image.

To attain an object as described above, the invention provides a radiation image reading apparatus as follows. A radiation image reading apparatus includes an image reading section for reading a radiation image on a stimulable phosphor sheet by scanning the stimulable phosphor sheet with exciting light in a main scanning direction, and a conveying section having a windable member to hold the stimulable phosphor sheet, a supporting member to support the windable member, and a driving section to move the windable member so as to convey the stimulable phosphor sheet to the image reading section in a sub scanning direction. The apparatus further includes a vibration damping mechanism being in contact with the windable member to damp vibration of the windable member, and a vibration refraining mechanism being in contact with the vibration damping mechanism to refrain vibration of the vibration damping mechanism itself.

According to the invention, the vibration damping can be optimized, corresponding to the cause of vibration, and conveying operation can be stabilized in a short time. Thus, vibration caused by a shock at a start of conveyance-driving of a conveying member from a stopped state can be effectively inhibited with effects to prevent generation of nonuniformity of a read image. Further, the invention has effects to minimize the preliminary conveying space, thereby improving space efficiency.

DETAILED DESCRIPTION OF THE PREFERRED EMBODIMENTS

The invention includes the followings structures.
(1) A radiation image reading apparatus scans a stimulable phosphor sheet with exciting light in a main scanning direction in such a manner that a holding member for holding the stimulable phosphor sheet and a weight balancer are hung by a wound connecting member, the connecting member being a windable member, and the stimulable phosphor sheet is moved in a sub scanning direction by a driving force transmitted to the connecting member, wherein the apparatus includes a vibration damping mechanism for damping the vibration of the connecting member, the mechanism being in contact with the connecting member, and a damping refraining mechanism for adjusting the vibration damping by the vibration damping mechanism.
(2) A radiation image reading apparatus scans a stimulable phosphor sheet with exciting light in a main scanning direction in such a manner that a holding member for holding the stimulable phosphor sheet and a weight balancer are hung by a wound connecting member and the stimulable phosphor sheet is moved in a sub scanning direction by a driving force transmitted to the connecting member, wherein the apparatus includes a roller which is held around a support shaft via a roller holding member, turnably around the shaft, and pressed to the side of the connecting member along the direction of the turning motion, a compression spring which is engaged around the support shaft and directly or indirectly presses the roller holding member at its one end, and an adjusting member which is engaged around the support shaft with its position in the support shaft direction adjustable and receives the other end of the compression spring.
(3) A radiation image reading apparatus scans a stimulable phosphor sheet with exciting light in a main scanning direction in such a manner that a holding member for holding the stimulable phosphor sheet and a weight balancer are hung by a wound connecting member and the stimulable phosphor sheet is moved in a sub scanning direction by a driving force transmitted to the connecting member, wherein the apparatus includes a roller which is held around a support shaft via a roller holding member, turnably around the shaft, and pressed to the side of the connecting member along the direction of the turning motion, and an air damper for providing a certain resistance force against the turning motion of the roller, the air pressure of the air damper being adjustable.

Figure 1:
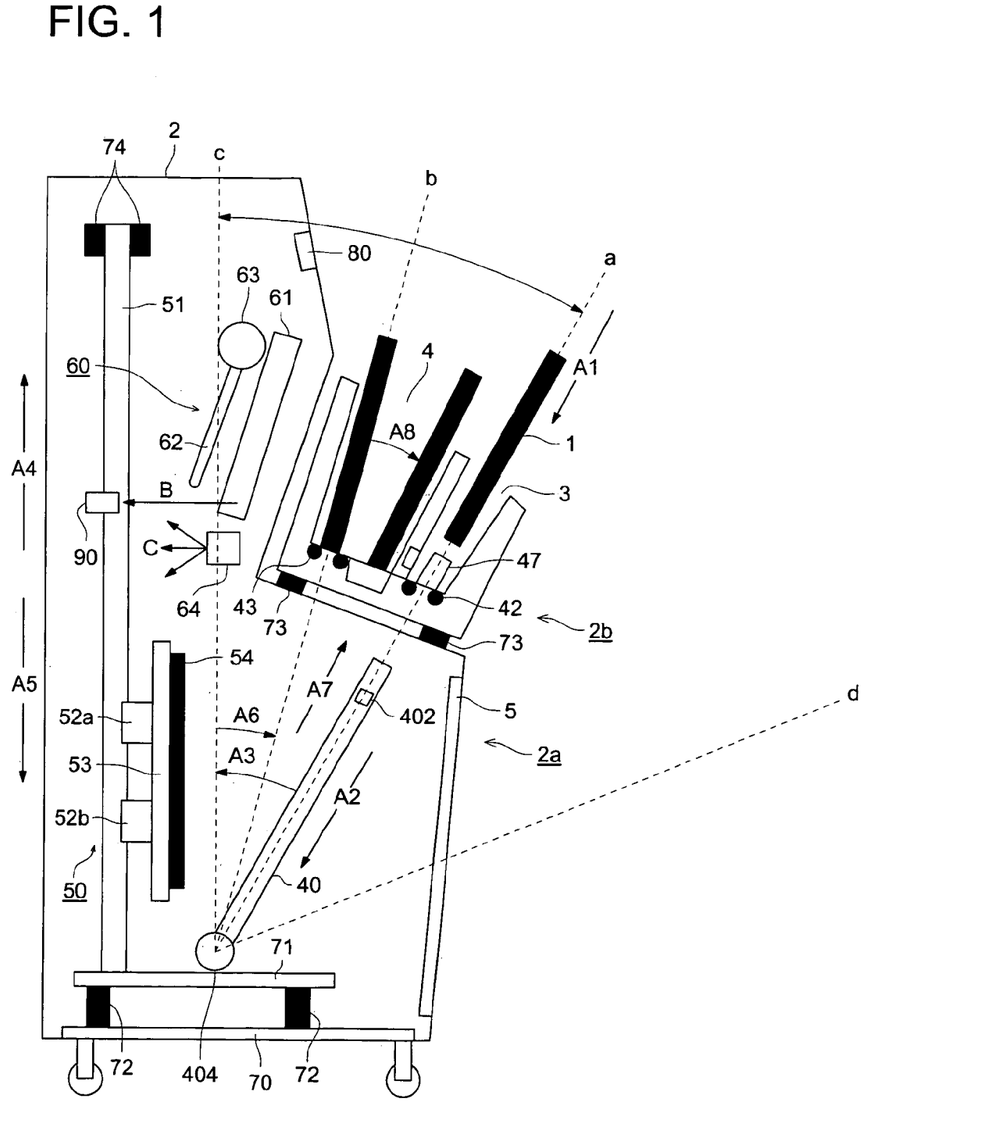
FIG. 1 is a schematic diagram showing the entire structure of a radiation image reading apparatus in accordance with an embodiment of the invention.

An embodiment of the invention will be described in detail below, referring to drawings. FIG. 1 is a schematic diagram showing the entire structure of a radiation image reading apparatus in accordance with the present the invention. A stimulable phosphor sheet is used, usually being protected by a case called a cassette.

An apparatus 2 is constructed by two units of a main section 2a and a cassette insertion/ejection section 2b. The cassette insertion/ejection section 2b is structured to be easily detachable from the main section 2a and provided with a cassette insertion opening 3 and a cassette ejection opening 4. Further, a rubber vibration isolator 73 is arranged between the main section 2a and the cassette insertion/ejection section 2b for a vibration isolation structure which isolates vibration caused by cassette insertion/ejection so that the vibration is not transferred to the main section 2a.

A sub scanning section 50 in the main section 2a and a cassette carrying unit 40 are mounted on the same base plate 71. A rubber vibration isolator 72 is arranged between the base plate 71 and a bottom plate 70, thus achieving a vibration isolation structure which prevents transfer of vibration from the cassette insertion/ejection section 2b to the sub scanning section 50.

A rubber vibration isolator 74 is arranged between the top end of the sub scanning section 50 and a frame, not shown, of the apparatus to reinforce the vibration isolation structure for the sub scanning section 50.

In the course of reading image information from the stimulable phosphor sheet by the main section 2a, even through inserting a cassette into the insertion opening 3, ejecting the cassette from the ejection opening 4, or vibrating the apparatus 2, such a vibration isolation structures makes it possible to prevent generation of noise on read image information due to vibration.

A cassette 1 containing an exposed phosphor is inserted into the insertion opening 3 in the direction of arrow A1. Herein, the cassette 1 is inserted in such a manner that the reading face of the stimulable phosphor sheet faces diagonally downward. When the cassette 1 has been inserted into the insertion opening 3, the presence of the cassette 1 is recognized by a cassette detection sensor (not shown). Then, the cassette is guided to the center of the insertion opening 3 by a lateral guide member 47 arranged in the insertion opening 3.

Next, the cassette 1 is taken into the apparatus 2 in the direction of arrow A2 along a dashed line a by the operation of insertion rollers 42, and then the cassette carrying unit 40 receives the carried cassette 1. When a cassette grip, not shown, on an ascending/descending table 402 catches the lower end of the cassette 1, the ascending/descending table 402 carries the cassette 1 along the carrying unit 40 in the direction A2 and stops at a predetermined position.

When the cassette 1 has been taken into inside the apparatus 2 by the carrying unit 40, the carrying unit 40 rotates from a position on the dashed line a to a position on a dashed line C in the direction of arrow A3 with a rotation shaft 404 as the rotation axis. Thus, the back side (having magnetism) of the cassette 1 is absorbed by a rubber magnet 54 with magnetic force.

Sub scanning section 50 is constructed by a sub scanning rail 51, a sub scanning movable section 52a and 52b, a sub scanning moving plate 53, and the rubber magnet 54. The sub scanning moving plate 53 is fixed to the sub scanning movable sections 52a and 52b, and can be moved up and down on the sub scanning rail 51 by a driving section described later. As the sub scanning rail 51, a linear guide, a linear bearing guide, or the like with high conveyance performance can be employed.

When the back side of the cassette 1 is absorbed by the rubber magnet 54, the cassette 1 is unlocked by a mechanism, not shown, thus a front plate for covering the stimulable phosphor sheet becomes detachable, and the carrying unit 40 rotationally moves to the direction of arrow A6 and stops at a waiting position (for example, at a position on the dashed line b). Thus, the front plate for covering the stimulable phosphor sheet is completely separated.

Next, the stimulable phosphor sheet is conveyed (sub scanned) in the direction of arrow A4 (upward). During this sub scanning operation, the stimulable phosphor sheet is scanned in the main scanning direction orthogonal to the sub scanning direction by laser beams B emitted from a laser scanning unit 61.

With the laser beams as photo-stimulative excitation lights, stimulation lights (image information) proportional to radiation energy accumulated in the stimulable phosphor sheet are released, and the stimulation lights are collected into a light collector 63 through a light guide 62. A photoelectric conversion device such as a photomultiplier is arranged on an edge surface of the light collector, to convert the collected stimulation lights into electric signals. The stimulation lights converted into the electric signals are subjected to signal processing as image data, and then output through a communication cable, not shown, from the apparatus 2 to an image output device such as an operation terminal, an image storage device, an image display, or a dry imager (none of them is shown).

In the present embodiment, a reader 60 is constructed by the laser scanning unit 61, the light guide 62, the light collector 63, the photoelectric conversion device, and the like, but not limited to this construction. The start time of taking in of the image data is preferably determined by detecting the top end of the back side of the cassette by a sensor 90. When a cassette is not present, the sensor 90 receives laser beams B and continues to output signals with a predetermined strength. When the top end of a cassette has moved to the position where laser beams B are shielded, the strength of electric signals output from the sensor 90 drops, thus making it possible to detect the top end of the cassette.

When reading the image information has been completed, the stimulable phosphor sheet is conveyed in the direction of arrow A5 (downward) and erasing lights C are emitted from an eraser 64 to erase image information remaining in the stimulable phosphor sheet. As an erasing lamp used in the eraser 64, a halogen lamp, a high intensity fluorescent lamp, an LED array, or the like can be employed.

When the back side of the cassette has stopped at a position where it had been delivered to the rubber magnet 54, the carrying unit 40 having waited at the waiting position rotationally moves again to the position on the dashed line c, covers the stimulable phosphor sheet with the front plate, and then rotationally moves to the position on the dashed line b again in the direction arrow A6 and stops.

The ascending/descending table 402 carries the cassette 1 in the direction toward the ejection opening 4 along the carrying member 40 and delivers the cassette 1 to ejection rollers 43. When the ejection rollers 43 have received the cassette 1, the rollers 43 perform ejection operation to completely eject the cassette 1 to the ejection opening 4. When the cassette 1 has been completely ejected to the ejection opening 4, the carrying unit 40 rotationally moves in the direction of arrow A6 to the position on the dashed line a and stops there, and then turns into a state which allows it to receive a next cassette 1.

Figure 2:
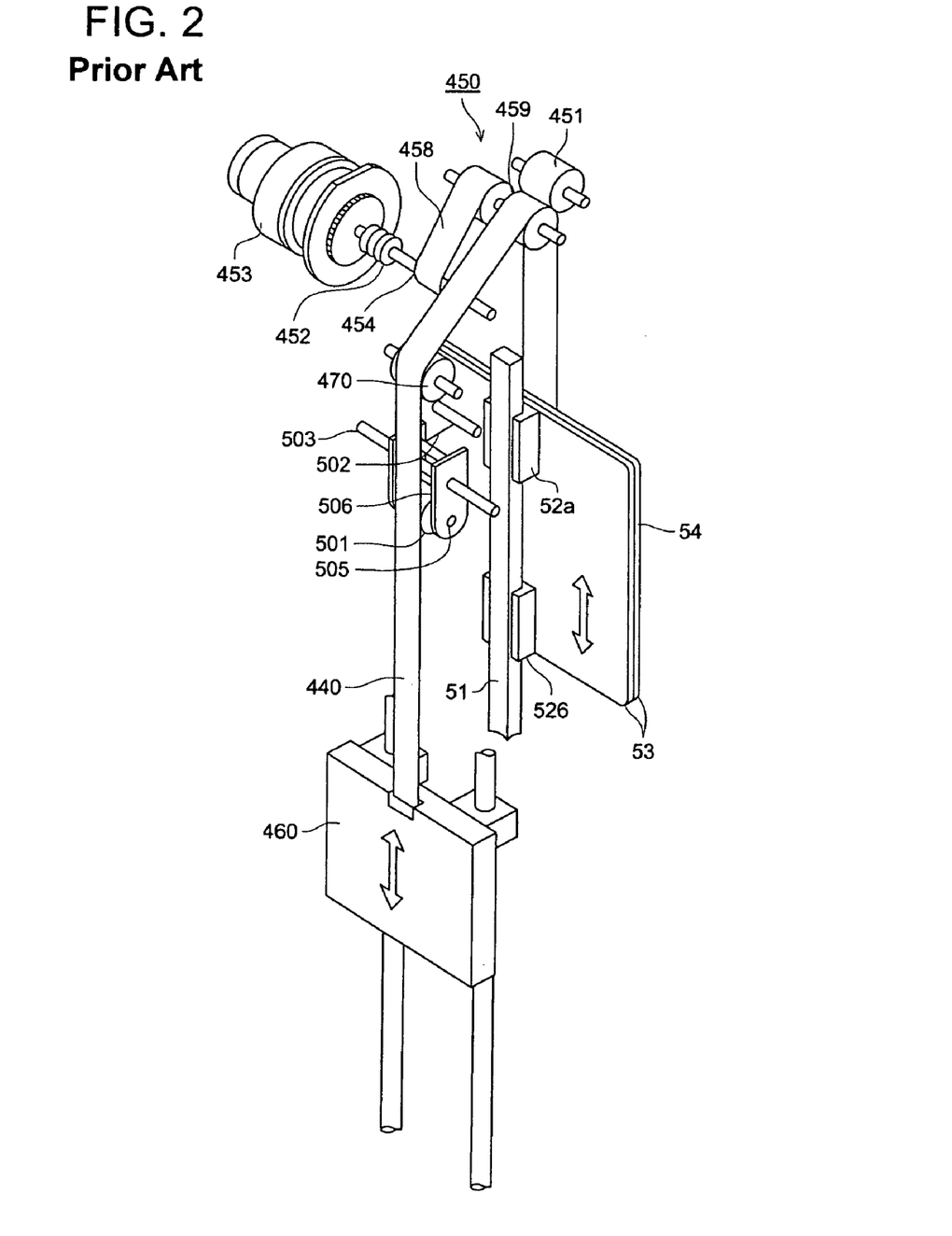
FIG. 2 is a fragmentary perspective isometric view of a conveying mechanism in a sub scanning section of an image reading apparatus disclosed in Patent Document 3.

FIG. 2 is a fragmentary perspective isometric view of a conveying mechanism in a sub scanning section 50 disclosed in Patent Document 3.

A pulley 459 is connected through a coupling 452 to a motor 453 fixed on a frame, not shown, the motor being a component of a deceleration mechanism 450 including a motor pulley 454 and an endless belt 458.

The top end of a sub scanning moving plate 53 is connected with an end of a belt 440, while the other end of the belt is connected with the top end of a balancing member 460 through a driven pulley 470 rotatively fitted to a frame, not shown. When the sub scanning moving plate 53 moves upward, the balancing member 460 moves downward, and in such a manner, the moving directions of them are completely opposite. In driving the belt 440, a backup roller 451 which forms a pair with the driving pulley 459 may be provided as well as the driving pulley 459.

The belt 440 is preferably formed by a material with a Young's modulus not less than 14.7 N/mm$^2$. Employing a metal belt, a metal wire, a resin belt, or the like, the belt 440 may be wound in a single quantity or in a combination of a parallel plurality. The belt may be arranged in a single quantity on the center line in the sub scanning direction or in a plurality at positions being axisymmetric with respect to the center line.

Figure 3:
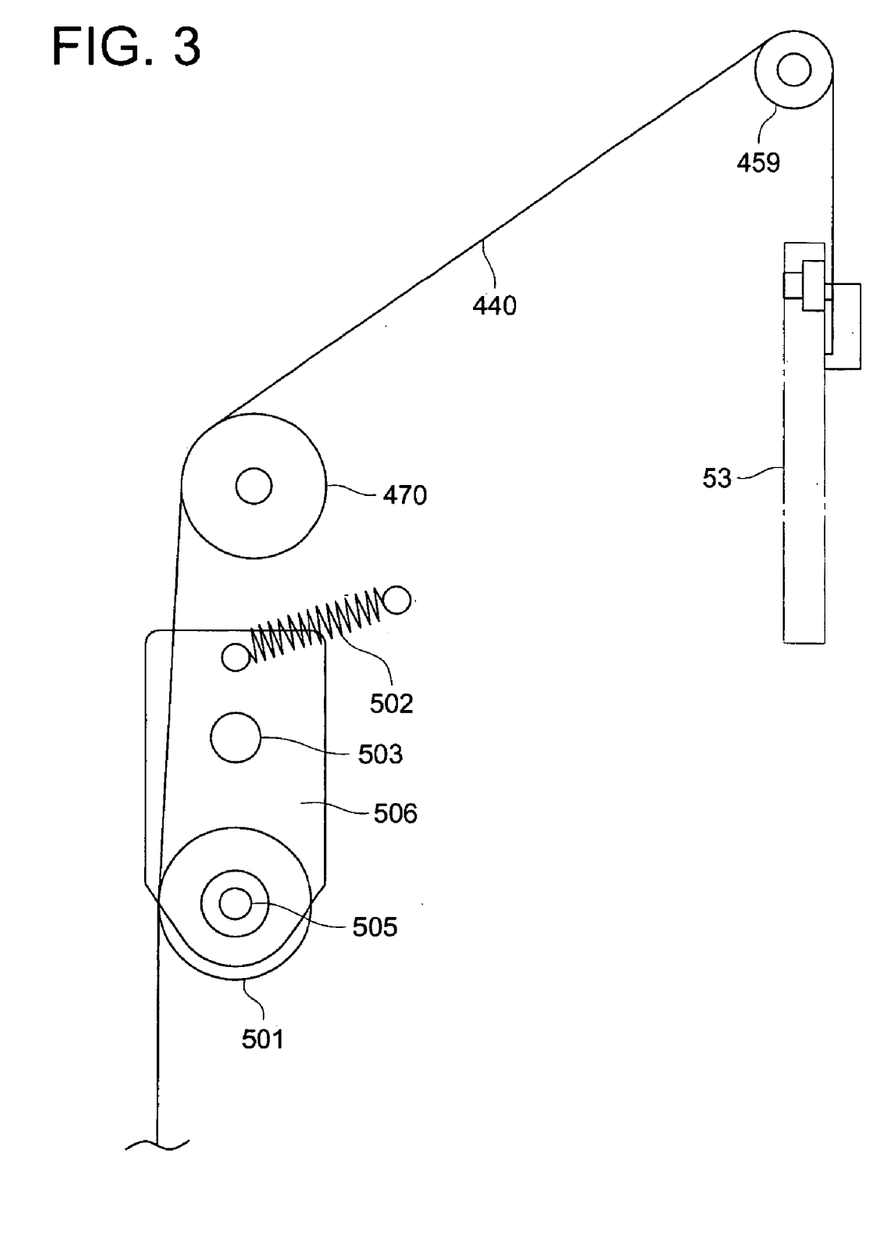
FIG. 3 is a diagram showing a vibration damping mechanism of the conveying mechanism shown in FIG. 2.

FIG. 3 is a diagram showing a vibration damping mechanism of the conveying mechanism. A roller 501 and a tension spring 502 are arranged between the driven pulley 470 and the balancing member 460 to press the belt 440 approximately orthogonally to the moving direction of the belt 440. The roller 501 is pressed all the time against the belt 440 by the tension spring 502. The strength of the tension force of the tension spring 502 is properly determined, corresponding to the tension of the belt 440. The pressing direction against the belt 440 may be opposite to the direction shown in the figure.

Figure 4:
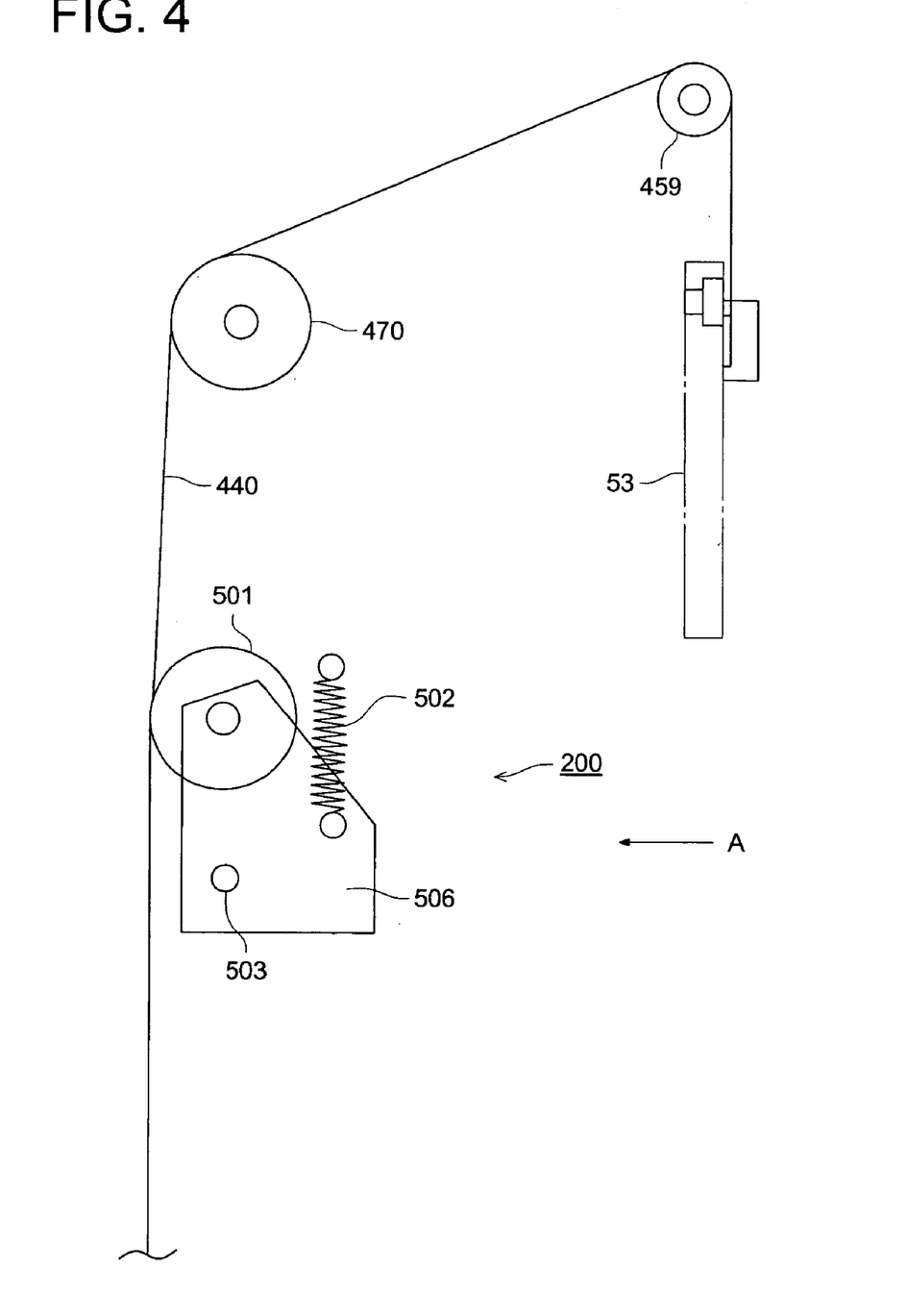
FIG. 4 is a diagram showing a vibration damping mechanism in accordance with an embodiment of the invention.
Figure 5:
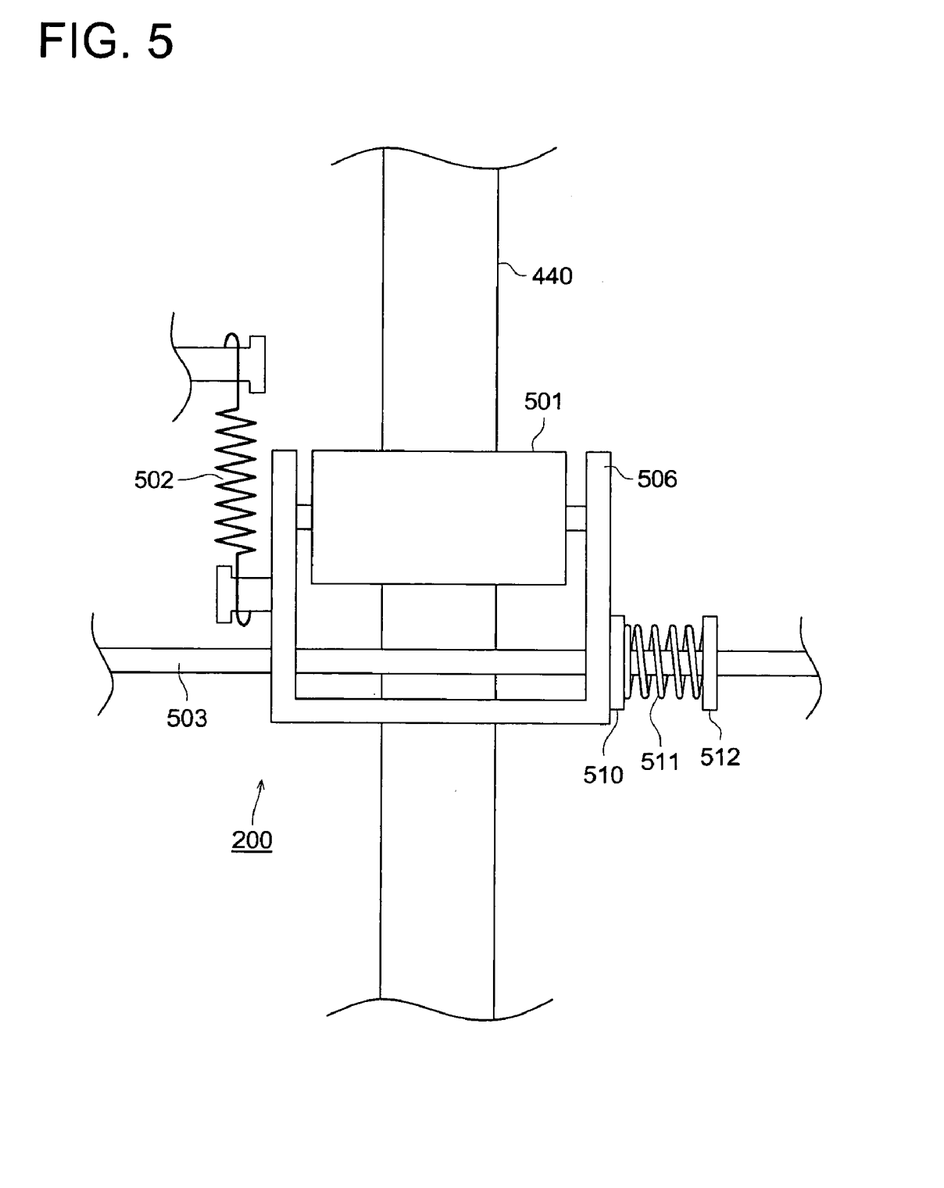
FIG. 5 is a fragmentary diagram of a vibration refraining mechanism in accordance with a first embodiment of the invention, viewed from arrow A in FIG. 4.

Next, a vibration refraining mechanism in a first embodiment in accordance with the invention will be described, referring to FIGS. 4 and 5. FIG. 5 is a fragmentary diagram of a vibration refraining mechanism in accordance with the first embodiment, viewed from the direction of arrow A in FIG. 4. The same reference numerals are given to elements having the same functions as those of elements shown in FIG. 3. Regarding a vibration damping mechanism 200 in the figure, a roller 501 is pressed by the tension force of a tension spring 502 through a press plate 506 supported rotatively around a support shaft 503 so that the roller 501 presses a belt 440 approximately orthogonally to the moving direction of the belt 440 to inhibit vibration of the belt 440, wherein the press plate 506 and a shaft also serves as a roller holding section for holding the roller 501.

As shown in FIG. 5, the vibration refraining mechanism in the first embodiment includes a compression spring 511 that is engaged around the support shaft 503 and presses one end of the press plate 506 through a press member 510, and further includes a member 512 engaged around the support shaft 503. The member 512 receives the opposite end of the compression spring 511, wherein the position of the member 512 is adjustable in the axis direction of the support shaft 503. For example, a male screw is formed on a part of the support shaft 503, the member 512 being engaged around a portion of this part, and a nut is employed as the member 512, thereby the position of the member 512 being adjustable in the axis direction.

The compressive force of the compression spring 511 is loaded to the press plate 506 through the press member 510 to cause a certain friction resistance against the rotation of the press plate 506. When the press plate 506 minutely rotates due to a shock from the belt at a start of conveyance driving of the belt from its stopped state, the friction between the press member 510 and the press plate 506 absorbs the shock to cause the vibration state to converge into a stable state.

Therefore, the time for convergence of the vibration varies with the compressive force of the compression spring 511, namely, with the degree of the initial shrinkage.

As the material of the press member 510, aluminum, stainless steel, a resin, can be adopted, for example.

The strength of the shock from the belt 440 is obtained in advance by experiments or the like, and corresponding to it, an optimum compressive force or initial shrinkage amount of the compression spring 511 is obtained to minimize the time for convergence of vibration. Then, the position of the member 512 in the axis direction is adjusted to adjust the initial shrinkage of the compression spring 511. Normally, the adjustment is made such that the compressive force is in a range from 0.1 to 2 N. If the force is not larger than 0.1 N, then the time for convergence of vibration may be too long. If the force is not smaller than 2N, then the turning motion of the vibration damping unit may be dull.

Figure 6:
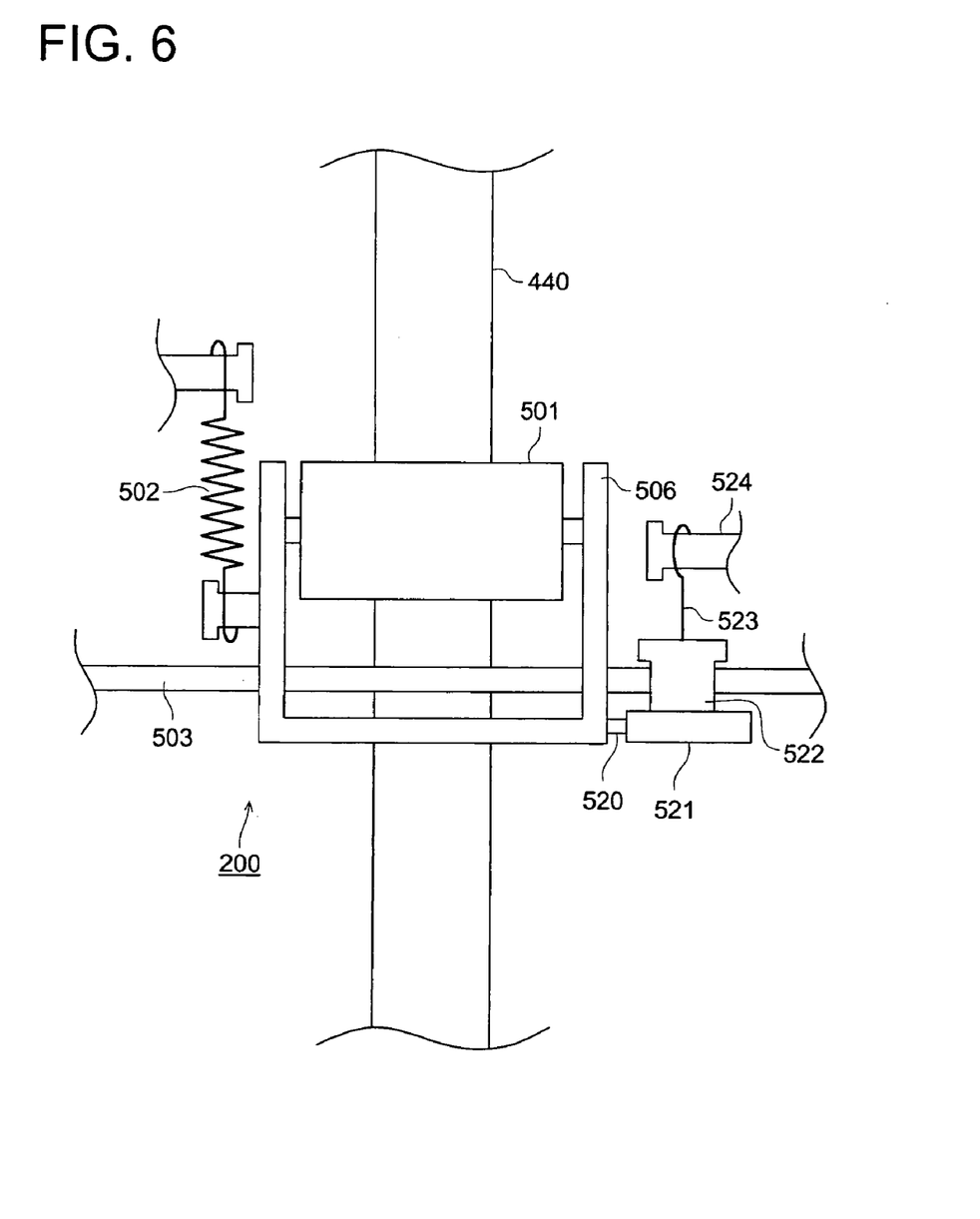
FIG. 6 is a fragmentary diagram of a vibration refraining mechanism in accordance with a second embodiment of the invention, viewed from arrow A in FIG. 4.

Next, a vibration refraining mechanism in a second embodiment in accordance with the invention will be described, referring to FIGS. 4 and 6. FIG. 6 is a fragmentary diagram of the vibration refraining mechanism in accordance with the second embodiment, viewed from the direction arrow A in FIG. 4. The same reference numerals are given to elements having the same functions as those of elements shown in FIG. 3. Same as the first embodiment, regarding the vibration damping mechanism 200 in the figure, a roller 501 is pressed by the tension force of a tension spring 502 through a press plate 506 supported rotatively by a support shaft 503 so that the roller 501 presses a belt 440 approximately orthogonally to the moving direction of the belt 440 to inhibit vibration of the belt 440.

As shown in FIG. 6, the dumping refraining mechanism of the second embodiment includes an air damper 522 that provides a certain resistant force against the rotation motion of the press plate 506, the air pressure of the air damper being adjustable.

A damper fitting plate 521 is turnably fitted to the press plate 506 through a shaft member 520. A fixing end of the air damper 522 is fixed to the damper fitting plate 521. A hook 523 is arranged on the piston shaft of the air damper 522 and is hung on a hanging shaft 524 which is fixed to a frame.

When the press plate 506 rotates, a cylinder section of the air damper 522 moves with respect to the piston shaft, and thus a certain resistance is provided against rotation of the press plate 506 by the air pressure of the air damper 522. When the press plate 506 minutely rotates due to a shock from the belt at a start of conveyance driving of the belt from its stopped state, the air damper 522 absorbs the shock to make the vibration state converge into a stable state.

Therefore, the time for convergence of the vibration varies with the strength of the air pressure of the air damper 522. The strength of the shock from the belt 440 is obtained in advance by experiments or the like, and corresponding to it, an optimum air pressure is obtained to minimize the time for convergence of vibration. Then, the air pressure of the air damper 522 is adjusted to an optimum value.

In the above first and second embodiments, even when damping performance on vibration is degraded through usage, the time for convergence of vibration can be minimized by re-adjustment.

In the above embodiments, a belt is employed as a connecting member for connecting a holding member for holding a stimulable phosphor sheet and a balancing member. However, it is also possible to use a connecting member of a wire or the like.

What is claimed is:

1. A radiation image reading apparatus comprising:
an image reading section for reading a radiation image on a stimulable phosphor sheet by scanning the stimulable phosphor sheet with exciting light in a main scanning direction;
a conveying section including a windable member to hold the stimulable phosphor sheet, a supporting member to support the windable member, and a driving section to move the windable member so as to convey the stimulable phosphor sheet to the image reading section in a sub scanning direction;
a vibration damping mechanism being in contact with the windable member to damp vibration of the windable member; and
a vibration refraining mechanism being in contact with the vibration damping mechanism to refrain vibration of the vibration damping mechanism itself.

2. The radiation image reading apparatus of claim 1, wherein the windable member is a belt.

3. The radiation image reading apparatus of claim 1, wherein the windable member is a wire.

4. The radiation image reading apparatus of claim 1, wherein the vibration refraining mechanism has an adjusting mechanism for adjusting degree of refraining the vibration damping mechanism from vibrating.

5. The radiation image reading apparatus of claim 1, wherein when the driving section starts driving of the windable member from a stopped state, the vibration refraining mechanism absorbs a shock applied to the vibration damping mechanism and thus refrains the vibration damping mechanism itself from vibrating.

6. The radiation image reading apparatus of claim 1, wherein the vibration damping mechanism comprises: a turnable roller; a roller holding section that is rotatable around a rotation shaft and holds the roller; and a press member for rotating the roller holding section so that the roller contacts with the windable member, and
wherein the vibration refraining mechanism comes in contact with the roller holding section so as to refrain the vibration damping mechanism itself from vibrating.

7. The radiation image reading apparatus of claim 6, wherein the vibration refraining mechanism is engaged around the rotation shaft and comprises a compression spring member that is directly or indirectly in contact with the roller holding section.

8. The radiation image reading apparatus of claim 7, wherein the vibration refraining mechanism comprises an adjustment member for adjusting a pressing force applied to the roller holding section by the compression spring.

9. The radiation image reading apparatus of claim 6, wherein the vibration refraining mechanism comprises an air damper of which air pressure is adjustable, and the air damper is arranged to provide a resistant force against rotation motion of the roller holding section so that the vibration of the vibration damping mechanism itself is absorbed.

* * * * *